United States Patent
Scott et al.

(10) Patent No.: US 6,320,627 B1
(45) Date of Patent: *Nov. 20, 2001

(54) DEMODULATING DIGITAL VIDEO BROADCAST SIGNALS

(75) Inventors: Jonathan Highton Scott, Horley; Justin David Mitchell; Christopher Keith Perry Clarke, both of Crawley; Adrian Paul Robinson; Oliver Paul Haffenden, both of London, all of (GB); Philippe Sadot, Ville d'Avray (FR); Regis Lauret, Sonchamp (FR); Jean-Marc Guyot, Paris (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/071,605

(22) Filed: May 1, 1998

Related U.S. Application Data

(60) Provisional application No. 60/054,195, filed on Jul. 30, 1997.

(30) Foreign Application Priority Data

| May 2, 1997 | (GB) | 9709063 |
| Dec. 22, 1997 | (GB) | 9727112 |
| Dec. 22, 1997 | (GB) | 9727113 |

(51) Int. Cl.[7] ............ H04N 5/455; H04N 9/66; H04L 27/06
(52) U.S. Cl. .......... 348/726; 375/340; 375/344
(58) Field of Search ............ 348/639, 726; 375/340, 341, 342, 343, 344, 354, 316, 324, 329, 332, 346, 348; 341/143; 370/210; 708/402, 404, 405; H04N 5/455, 9/66

(56) References Cited

U.S. PATENT DOCUMENTS

| 4,253,184 | * | 2/1981 | Gitlin et al. ............ 375/14 |
| 5,444,697 | * | 8/1995 | Leung et al. ............ 370/19 |
| 5,604,541 | * | 2/1997 | Kim et al. ............ 348/726 |
| 5,732,113 | * | 3/1998 | Schmidl et al. ............ 375/355 |
| 5,970,093 | * | 10/1999 | de Lantremange ............ 375/234 |
| 6,137,545 | * | 10/2000 | Patel et al. ............ 348/726 |
| 6,240,146 | * | 5/2001 | Stott et al. ............ 375/344 |

FOREIGN PATENT DOCUMENTS

| 0 683 576 A1 | 11/1995 | (EP) . |
| 0 762 703 A1 | 3/1997 | (EP) . |
| 2278257 | 11/1994 | (GB) . |
| WO 95/05042 | 2/1995 | (WO) . |

* cited by examiner

Primary Examiner—Reinhard J. Eisenzopf
Assistant Examiner—Brian P. Yenke
(74) Attorney, Agent, or Firm—Christopher P. Maiorana, P.C.

(57) ABSTRACT

A demodulator suitable for implementation in a single chip for demodulating digital video broadcast signals comprising data modulated on a multiplicity of spaced carrier frequencies, wherein an input broadcast signal is converted to a frequency sufficiently low to enable analog digital conversion of the signal, the demodulator comprising analog to digital conversion means (20) for converting the broadcast signal to a series of digital samples, real to complex conversion means (22) for converting each digital sample to a complex number value, Fourier transform means (24) for analyzing the complex number values to provide a series of signal values for each carrier frequency, frequency control means (9, 38), comprising means responsive to the output of said Fourier Transform means for producing a signal for controlling the frequency of the signal formed by said complex number values, and signal processing means for receiving the signal values and providing an output for decoding, the signal processing means including channel equalization means (32) and channel state information generating means (34).

22 Claims, 2 Drawing Sheets

ARCHITECTURE OF THE DTTV INTEGRATED CIRCUIT

ARCHITECTURE OF THE DTTV INTEGRATED CIRCUIT

DEMODULATING DIGITAL VIDEO BROADCAST SIGNALS

This application claims the benefit of U.S. Provisional Application No. 60/054,195, filed Jul. 30, 1997, which is a hereby incorporated by reference in its entirety.

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath, and co-channel interference, for example. A type of transmission which has been developed to meet these problems is known as Coded Orthogonal Frequency Division Multiplexing (COFDM)—see for example "Explaining Some of the Magic of COFDM" Stott, J. H.—Proceedings of 20th International Television Symposium, Montreux, June 1997. In COFDM, transmitted data is transmitted over a large number of carrier frequencies (1705 or 6817 for DVB), spaced (by the inverse of the active symbol period) so as to be orthogonal with each other; the data is convolutionally coded, to enable softdecision (Viterbi) decoding. Metrics for COFDM are more complex than those of single frequency networks in that they include Channel State Information (CSI) which represents the degree of confidence in each carrier for reliably transmitting data.

Modulation and Demodulation of the carriers may be carried out by a Fast Fourier Transform (FFT) algorithm performing Discrete Fourier Transform operations. Naturally, various practical problems arise in demodulation, firstly in translating the transmitted signal to a frequency at which demodulation can be carried out, and secondly by accurately demodulating the data from a large number of carriers in a demodulator which is not overly complex or expensive.

It is an object of the present invention to provide a demodulator for digital. terrestrial broadcast signals which can demodulate data transmitted by a COFDM system but which may be manufactured simply and inexpensively, preferably in a single integrated circuit chip.

The present invention provides as a first aspect, apparatus for demodulating digital video broadcast signals comprising data modulated on a multiplicity of spaced carrier frequencies, including:

down-conversion means for converting an input broadcast signal to a frequency sufficiently low to enable analog to digital conversion of the signal;

analog to digital conversion means for converting the broadcast signal to a series of digital samples, real to complex conversion means for converting each digital sample to a complex number value, Fourier Transform means for analysing the complex number values to provide a series of signal values for each carrier frequency, frequency control means, comprising means responsive to the output of said Fourier Transform means for producing a signal for controlling the frequency of the signal formed by said complex number values, and signal processing means for receiving the signal values and providing an output for decoding, the signal processing means including channel equalisation means and channel state information processing means.

In accordance with the invention, the input broadcast signal which is normally a UHF signal, say 700 MHz, is down converted, preferably in two stages, firstly to about 30–40 MHz and secondly to about 4.5 MHz. Since the bandwidth of the signal is about 7.6 MHz, an IF frequency of 4.5 MHZ represents essentially a DC or base band signal which can then be sampled by means of an analog to digital converter. Subsequent to analog to digital conversion, the sampled signal is converted to complex number values, in order to represent a true DC signal centred on 0 Hz. This facilitates the operation of the Fourier transform device which as mentioned above is normally an FFT performing a DFT on each carrier signal. The result of the transform is a series of data values for the data encoded on each carrier wave.

The data is processed, principally for channel equalisation and for weighting the contribution of each channel by the derived Channel State Information.

Another signal processing employed is correction for common phase error. As will become clear below, phase error in COFDM signals is present in two components, a random component and a component which is common to all carriers, arising from local oscillator phase noise. Such common phase error may be removed by a technique as described in more detail below.

The process of demodulation requires very accurate tracking of the input signal and to this end automatic frequency control and timing control are desirable. Timing control is necessary in order to ensure that the timing window for the FFT is correctly positioned in relation to the input waveforms. Thus, the sampling by the ADC must be synchronised with the input wave forms. For an input signal centred on 4.57 MHz, an ADC operating frequency of 18.29 MHz (4.57×4) is preferred. The ADC is maintained in synchronisation by a loop control wherein the complex signal value at the input of the FFT is applied to a time synchronisation unit whose output is converted in a digital to analog converter (DAC) to an analog value, which is employed to control a voltage controlled oscillator providing a clock signal to the ADC.

Automatic frequency control (AFC) is necessary to maintain the demodulation process in synchronisation with down-conversion, otherwise a gradually increasing phase error occurs in the recovered signals. To this end, a signal derived subsequent to the FFT, from the demodulated signals may be fed back to the local oscillator for IF generation in order to maintain frequency synchronisation. However, such control has disadvantages of complication in that a control signal must be fed back to the IF generation means and the control signal must adjust the reference crystal within the search range of the AFC. As an alternative therefore, AFC may be provided as a digital control applied to a digital frequency shifter coupled the input of the FFT device. The process of automatic frequency control (AFC) is described in more detail below. However, it will be shown that AFC requires a coarse control and a fine control. The fine control is dependent upon measuring the phase difference (first difference) between two adjacent continual pilot signal samples, whereas the coarse control requires the determination of rate of change of phase (or second difference) i.e., the difference between two consecutive phase differences between adjacent samples.

An important consideration in designing a demodulator for incorporation in an integrated circuit chip is reducing the separating requirements for memory. Bearing in mind the chip may only contain about 1 M Bit of memory, and that signal values for up to about 7000 carrier frequencies may be processed in the chip, this requires tight control over the use of available memory. Certain operations such as Fourier transformation and symbol interleaving require fixed amounts of memory (about 50% of the total). However, other operations such as timing synchronisation, common phase error (CPE) correction, and channel equalisation require some memory but the amount of memory can be adjusted.

In particular, as will become clear below, common phase error requires at least one symbol delay (for each carrier) and channel equalisation may use three symbols delay (for each carrier). However, as pointed out above, automatic frequency control requires measuring phase differences, as does common phase error control. It has been found that by using the signal for second difference in phase error, it is possible to adjust the channel equalisation to use only two symbols delay. Since the common phase error determination already employs two symbols delay, it has been found, in accordance with the invention, that memory required for such two symbol delays may be shared between CPE correction and channel equalisation, so that data is stored in the same memory area for the two operations in different phases of operation of the demodulator.

Accordingly, the present invention provides in a further aspect, apparatus for demodulating a digital video broadcast signal comprising data modulated on a multiplicity of spaced carrier frequencies, the apparatus including:

transform means for analysing a version of the broadcast signal to provide a series of signal values for each of the multiplicity of carier frequencies, phase error correction means for recovering the common phase error in said signal values, including a first plurality of delay elements for processing delayed versions of the signal values with current signal values, channel equalisation means for compensating for communication channel impairments for receiving the phase error corrected signal values and including a second plurality of delay elements for processing delayed versions of the signal values with the current values, and wherein the apparatus is arranged such that the phase error correction means employs said first plurality of delay elements in one phase of operation and the channel equalisation means employs said second plurality of delay elements in a different phase of operation whereby to permit the first and second plurality to be constituted by the same memory elements.

BRIEF DESCRIPTON OF THE DRAWINGS

A preferred embodiment of the invention will now be described with reference to the accompanying drawings, in which.

DESCRIPTION OF THE PREFERRED EMBODIMENTS

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit chip that accepts the analog signal from the down-converter and performs the required DSP operations, which include synchronisation and demodulation, to form a stream of soft decisions suitable for presentation to an FEC decoder (Forward Error Correction decoder).

Full compliance to the DVB-T specification means that the chip is capable of decoding signals transmitted in the following modes:

1) A signal that contains either 1705 or 6817 active carriers, commonly referred to as 2K and 8K respectively. The chip includes the functionality and memory required to perform the FFT algorithm in both modes.
2) Non-hierarchical QPSK, 16-QAM and 64-QAM constellations.
3) Hierarchical 16-QAM and 64-QAM constellations, either uniform or non-uniform with the possible scale factors $\alpha=2$ and $\alpha=4$.
4) Guard intervals ¼, ⅛, ⅟₁₆ and ⅟₃₂ of the OFDM symbol length.
5) Viterbi code rates ½, ⅔, ¾, ⅚ and ⅞.

Figure 1:
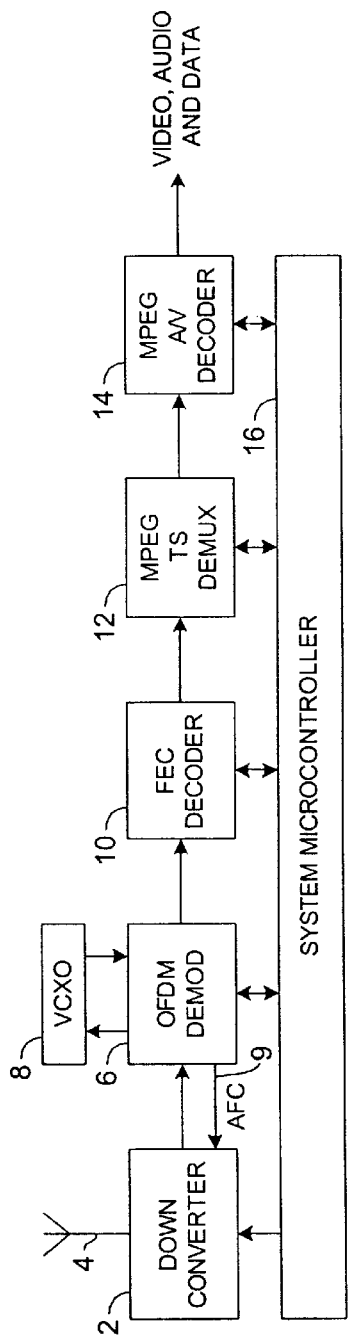
FIG. 1 is a schematic block diagram of a digital terrestrial front end-converter incorporating the present invention.

Referring now to FIG. 1, a block diagram of the front end system, a down-converter 2 receives the input UHF broadcast signal from an antenna 4 and converts the carrier signal to a first IF frequency of 30–40 MHz and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitises the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 2:
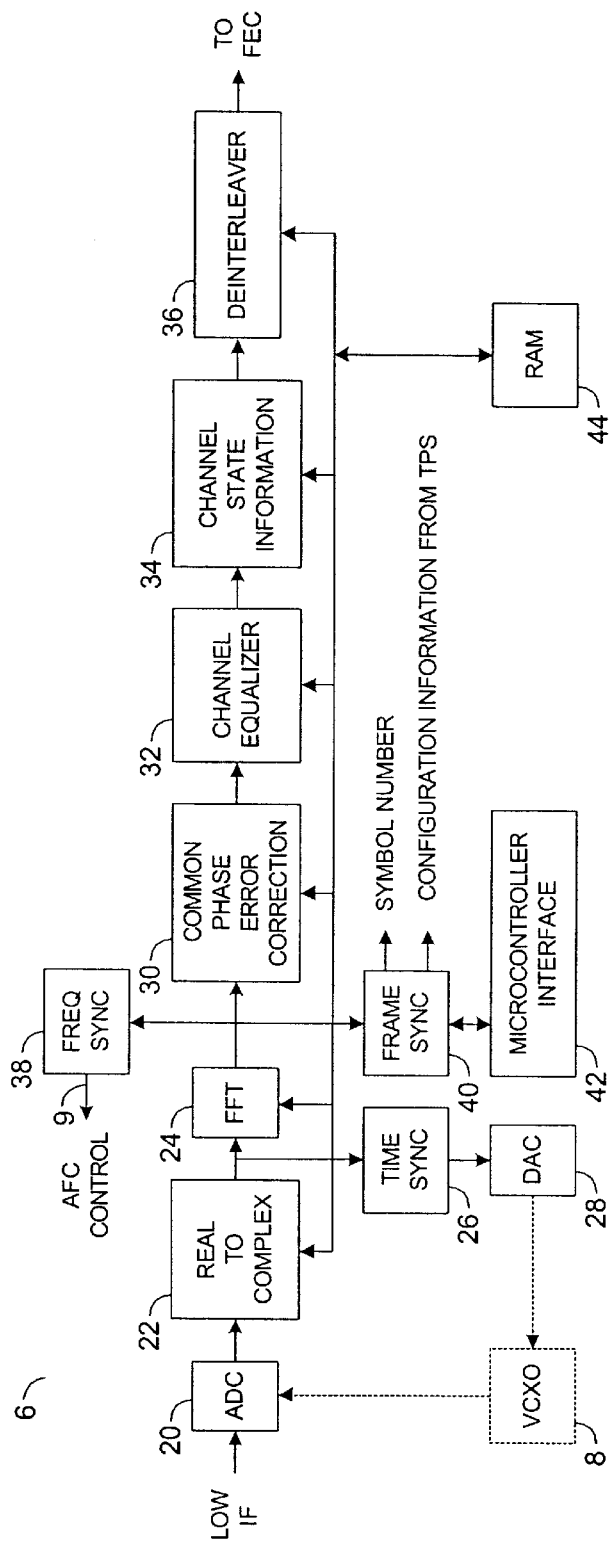
FIG. 2 is a more detailed block diagram of demodulating apparatus according to the invention forming part of the converter of FIG. 1.
Figure 3:
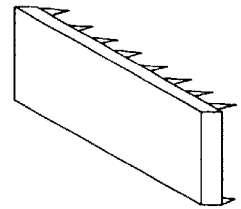
FIG. 3 is a schematic view of a chip incorporating the apparatus of FIG. 2.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centred on zero frequency. This signal is fed to a Fast Fourier Transform device (FFT) 24 and to a timing synchronisation unit 26 which derives a value from the complex input signal which is fed to a digital to analog converter 28 to supply an analog control voltage to a voltage controlled oscillator 8, which provides a sampling clock signal to analog to digital converter 20.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equaliser 32, a channel state information correction unit 34 and a deinterleaver 36. The signal thus processed is then passed at an output from the demodulator to forward error correction unit 10. The phase error correction block 30 calculates the common phase error of the signal and applies the necessary correction. The channel equaliser 32 first performs linear temporal equalisation followed by frequency equalisation using a high order interpolating filter. The equaliser outputs an equalised constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronisation unit 38 which converts it to a control signal for automatic frequency control, which acts upon a local oscillator in down-converter unit 2 for adjusting the frequency of the first or second IF.

In addition, the output of FFT 24 is fed to a frame synchronisation unit 40 whose outputs are fed forward to units 10, 12 and 14 (FIG. 1). A microcontroller interface 42 is provided, and in addition RAM memory 44 is provided to which all the units 22, 24, 30–36 have access to in order to provide their required operations.

Channel Impairments

The front end architecture of FIG. 1 must provide the best possible performance under actual operating conditions. There are several key types of channel impairments that the front end must be adept at dealing with, as follows:

1) Adjacent analog television signals. In multi-frequency networks OFDM signals may be transmitted in adjacent channels to PAL signals that could be 30 dB higher in power. Therefore, special care must be taken when designing the IF filtering scheme in the down-converter, in particular by providing a high pass filter for the second IF having a stop band from 0 Hz to a certain higher frequency.
2) Co-channel analog television interference. This will be particularly significant in interleaved frequency networks.
3) Delayed signal interference, either due to reflections from natural obstacles, or created by the network itself as is the case with single frequency networks. Such interference causes frequency selective fading which may completely erase, or significantly affect the reliability of, the bits of information carried by some of the OFDM carriers. This is compensated for in Channel State Information block 34.
4) Narrow-band interference coming from intermodulation products due to nonlinearities in the transmission chain may also corrupt the bits of information carried by some of the OFDM carriers but in a different way from the frequency selective fading.
5) Co-channel interference from artificial sources such as radio microphones operating in the UHF frequency.
6) and of course thermal noise, as is present in every transmission system.

The down-converter 4 must cope with the specific requirements of COFDM whilst operating in the channel conditions described above. This means:

1) The IF must ensure the proper rejection of adjacent channel analog television signals.
2) The gain distribution must preserve linearity in order not to create intermodulation products between the OFDM carriers, thus creating a self-interference effect on the signal, and
3) The synthesiser phase-noise characteristics must be compatible with 64-QAM operation.

Memory Budget

A significant problem for demodulator integrated circuit 6 is the amount of RAM 42 that the chip requires.

TABLE 1

Proportion of RAM used

| Architecture component | % RAM |
| --- | --- |
| Timing synchronisation | 2% |
| Freguency synchronisation | 11% |
| FFT | 38% |
| Common phase error correction | 11% |
| Channel equalisation | 23% |
| Channel State Information | 3% |
| Deinterleaver | 12% |

It is necessary to make the best possible use of the RAM. Some of the blocks of memory, such as the FFT and symbol deinterleaver, require fixed amounts of RAM and it is not possible to reduce them (except by reducing the word widths and so degrading the performance). Other blocks, for example, the timing synchronisation, required some algorithmic alterations for the sole purpose of reducing the amount of memory but without degrading the performance. A technique that is employed to make best use of the available memory is to "reuse" some of the memories. For example, the data delay required to implement common-phase-error correction doubles as the first data delay in the channel equaliser. This means that only two additional data delays were required to implement full linear temporal equalisation. This is explained in more detail below with reference to FIG. 4.

Table 1 shows the final allocations of RAM that were made in the chip. As this table shows, the highest memory usage is in the FFT circuitry and the smallest is in the timing synchronisation circuitry. This memory allocation provides the best compromise between performance and cost.

Analog versus Digital AFC

One of the processes that is required in the synchronisation of the demodulator is to obtain frequency synchronisation. There is a choice as to whether to apply the required frequency shift as an analog correction in the down-converter 2, or as a digital frequency shift in the demodulator chip.

Analog Frequency Correction

If the frequency correction is implemented by adjusting the frequency of the reference crystal in the down-converter 2, then a control signal on line 9 is provided from the output of the integrated circuit 6 back to the down-converter. This method has the advantage that a SAW filter inside the down-converter can be made as narrow as possible. The disadvantages are twofold. First, the integrated circuit must pass a control signal back to the down-converter. Second, the architecture of the down-converter is made more complicated since the control signal must adjust the reference crystal within the search range of the AFC.

Digital Frequency Correction

If the frequency correction is implemented in the integrated circuit 6, then the architecture of the down-converter 2 is made much simpler since there is no longer any need to have a control signal from the chip 6, and the loop in the down-converter that drives the reference crystal is no longer required. The disadvantage of this method is that the bandwidth of the SAW filter must be increased by the AFC search range. This causes a significant penalty in terms of the adjacent channel protection ratio when the receiver is used in an environment where the existing analogue services are operated in adjacent channels to digital services. The architecture described will permit both analog and digital correction.

Temporal Response versus Noise Averaging in Channel Equaliser 32

The signal from the FFT is affected by all the impairments caused by the channel; for example, in the presence of a single echo, the FFT output will suffer from frequency selective fading. The purpose of the channel equaliser 32 is to rotate and scale the constellation so that the constellations on all the carriers are of a known size (but not necessarily of the same reliability). The process is performed by using the scattered pilot information contained in the COFDM signal. The scattered pilots provide a reference signal of known amplitude and phase on every third OFDM carrier. Since this scattered pilot information is subject is subject to the same channel impairments as the data carriers, the scattered pilots are noisy.

In the present invention, temporal linear interpolation is performed between two received scattered pilots, and these interpolated values are used as the reference for frequency equalisation of the data. Since scattered pilots at the same time duration are spaced 4 OFDM symbols apart, a compensating data delay of 3 OFDM symbols must be provided to permit this option.

Common Phase Error Correction versus Down Converter Performance

The down converter performance has a different set of requirements from those demanded by down-converters suitable for analog television. For example, in a down-converter for analogue television, particular attention must be given to the group delay-characteristics. However COFDM has been specially designed to be robust to this type of distortion, and so the group delay is much less important.

Another difference between the two requirements is in the local oscillator phase noise performance. The addition of local oscillator phase noise to an OFDM signal has two principal effects:

1) To rotate the received constellation by an amount which is the same for all carriers within one OFDM symbol, but varying randomly from symbol to symbol. This is called the common phase error (CPE) and primarily results from the lower—frequency components of the phase noise spectrum; and 2) To add Inter-Carrier Interference (ICI) of a random character similar to additive thermal noise. ICI primarily results from the higher frequency components of the phase-noise spectrum. ICI cannot be corrected and must be allowed for in the noise budget. It can be kept small in comparison with thermal noise by suitable local oscillator design.

It is possible to remove the common phase-error component caused by phase noise added in the down-converted by digital processing in the chip. This processing is performed by the common-phase-error correction block 30.

The common-phase-error correction block 30 is able to remove the common phase error because all carriers within a given symbol suffer the same common phase error. By measuring the continual pilots, whose intended phase is the same from symbol to symbol, the common phase error is determined and then subtracted from the phase of all the data cells in the same symbol. There are sufficient continual pilots (which in any case are transmitted with a power approx. 2.5 dB greater than data cells) that the effect of thermal noise on this measurement can be rendered negligible by averaging.

There are essentially three components required to implement common-phase-error correction in the chip. These are:

1) A one-symbol data delay; since the common phase error varies randomly from symbol to symbol, it must be applied to the symbol from which it was calculated. Furthermore, it is not possible to calculate the common phase error until the whole symbol has been received.

2) The digital circuitry required to calculate the common phase error based on the received data.

3) A phase-to-complex-number look-up table. This is required since the common phase error value that is calculated will be a phase value. In order to apply the correction to the signal, the signal must be multiplied by a complex number equal to the complex representation of the phase.

These three factors, which together form the "cost" of implementing the feature on the chip, must be balanced against the cost of improving the performance of the down-converter so that the phase-noise it introduces is negligible.

Figure 4:
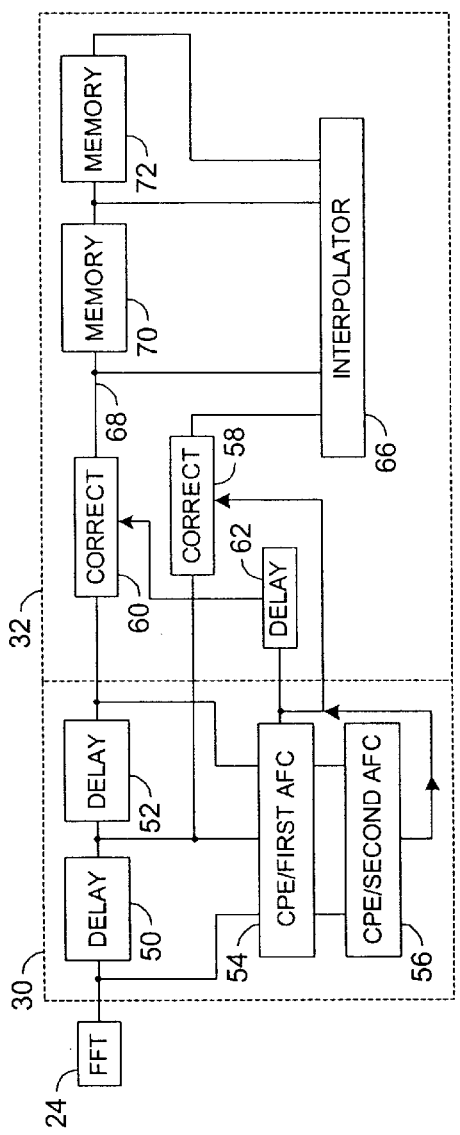
FIG. 4 is a schematic block diagram of phase error correction means and channel equalisation means.

Referring now to FIG. 4, this shows a more detailed block diagram of the common phase error correction circuit 32 and channel equaliser 30. The common phase error correction circuit 30 receives an output from FFT 24 which is applied to first and second delay elements 50, 52 (two such elements being provided for each carrier frequency). Signals from the inputs and outputs of delay elements 50, 52 are provided to subtraction circuits in a unit 54 in order to derive phase error signals (first difference). In addition, the difference (second difference) between the phase error signals is determined in unit 56. These phase error signals are averaged for the continual pilot signals, as more particularly described in our copending application (GBP1288A). The assessed common phase error is applied to correction circuits 58, 60, the output to correction circuit 60 being applied via a further delay element 62. The signal outputs from memory elements 50, 52 are thus corrected for phase in circuits 58, 60, and are applied to an interpolator 66 in channel equaliser circuit 32. The output circuit from correction circuit 58 is applied directly to the interpolator, but the signal from correction circuit 60 is applied to the interpolator firstly directly at tapping 68 and then via first and second memory elements 70, 72. Since the interpolator is provided with three sets of delayed symbols from delay element 62 and memory elements 70, 72 interpolation can be carried out on scattered pilots spaced four symbols apart, as provided in the ETSI standard and as described above.

By arranging for the circuits to operate in two phases of operation, in the first of which the common phase error is computed using delay elements 50, 52, and in the second of which interpolation occurs using memory elements 70, 72, it is possible to provide the two sets of memory elements 50, 52 and 70, 72, from the same section of ram memory.

What is claimed is:

1. An apparatus for demodulating digital video broadcast signals comprising data modulated on a multiplicity of spaced carrier frequencies, comprising:

a down-conversion circuit configured to convert an input broadcast signal to a frequency sufficiently low to enable analog-to-digital conversion of the signal;

an analog-to-digital conversion circuit configured to convert the broadcast signal to a series of digital samples;

a real-to-complex conversion circuit configured to convert each digital sample to a complex number value;

a Fourier transform circuit configured to analyze the complex number values and provide a series of signal values for each carrier frequency;

a frequency control circuit configured to produce a signal for controlling the frequency of the signal formed by said complex number values in response to the output of said Fourier transform circuit; and a signal processing circuit configured to provide an output for decoding in response to the signal values, wherein the signal processing circuit comprises a channel equalization circuit and channel state information generating circuit.

2. The apparatus according to claim 1, wherein the down-conversion circuit comprises a first intermediate frequency circuit and second intermediate frequency circuit configured to produce a second intermediate frequency having a first bandwidth.

3. The apparatus according to claim 2, wherein the second IF frequency is about 4.5 MHZ.

4. The apparatus according to claim 3, wherein a sampling frequency of the analog-to-digital conversion circuit is a multiple of the second IF frequency.

5. The apparatus according to claim 4, wherein the multiple is four times.

6. An apparatus according to claim 2, wherein a sampling frequency of the analog-to-digital conversion circuit is a multiple of the second IF frequency.

7. An apparatus according to claim 6, wherein the multiple is four times.

8. An apparatus according to claim 7, further comprising:
a time synchronization circuit configured to control the sampling by the analog-to-digital conversion circuit and provide a signal configured to control a voltage control oscillator to determine the sampling frequency of the analog-to-digital conversion circuit, in response to the complex number values.

9. An apparatus according to claim 1, further comprising:
a time synchronization circuit configured to control the sampling by the analog-to-digital conversion circuit and provide a signal configured to control a voltage control oscillator to determine the sampling frequency of the analog-to-digital conversion circuit, in response to the complex number values.

10. The apparatus according to claim 9, wherein said frequency control circuit is further configured to provide a signal to control local oscillators for said first and/or second IF frequencies, in response to the output of said Fourier transform circuit.

11. The apparatus according to claim 1, wherein said frequency control circuit is further configured to provide a signal to control local oscillators for said first and/or second IF frequencies, in response to the output of said Fourier transform circuit.

12. The apparatus according to claim 1, wherein said frequency control circuit is arranged to provide a digital correction signal for application to the input of said Fourier Transform circuit.

13. The apparatus according to claim 8, wherein said frequency control circuit is further configured to provide a digital correction signal for application to the input of said Fourier transform circuit.

14. The apparatus according to claim 13, further comprising:
a phase-error-correction circuit configured to remove the common phase error in said signal values, comprising a first plurality of delay elements configured to process delayed versions of the signal values with current signal values; and
a channel equalization circuit configured to compensate for communication channel impairments of the phase-error-corrected signal values, comprising a second plurality of delay elements configured to process delay versions of the signal values with the current values, wherein the phase-error-correction circuit is further configured to employ said first plurality of delay elements in one phase of operation of the apparatus and the channel equalization circuit is configured to employ said second plurality of delay elements in a different phase of operation of the apparatus, wherein the first and second pluralities are constituted from a single plurality.

15. The apparatus according to claim 1, further comprising:
a phase-error-correction circuit configured to remove the common phase error in said signal values, comprising a first plurality of delay elements configured to process delayed versions of the signal values with current signal values; and
a channel equalization circuit configured to compensate for communication channel impairments of the phase-error-corrected signal values, comprising a second plurality of delay elements configured to process delay versions of the signal values with the current values, wherein the phase-error-correction circuit is further configured to employ said first plurality of delay elements in one phase of operation of the apparatus and the channel equalization circuit is configured to employ said second plurality of delay elements in a different phase of operation of the apparatus, wherein the first and second pluralities are constituted from a single plurality.

16. An apparatus for demodulating a digital video broadcast signal comprising data modulated on a multiplicity of spaced carrier frequencies, comprising:
a conversion circuit configured to convert the broadcast signal to a complex number version of the broadcast signal;
a transform circuit configured to analyze the complex number version of the broadcast signal to provide a series of signal values for each of the multiplicity of carrier frequencies;
a phase error-correction circuit configured to remove the common phase error in the signal values, comprising a first plurality of delay elements configured to process delayed versions of the signal values with the current signal values;
a frequency control circuit configured to produce a signal for controlling the frequency of the complex number version of the broadcast signal, in response to the phase-error-corrected signal values; and
a channel equalization circuit configured to compensate for communication channel impairments of the phase-error-corrected signal values, comprising a second plurality of delay elements configured to process delayed versions of the signal values with the current values, wherein the phase-error-correction circuit is further configured to employ the first plurality of delay elements in one phase of operation of the apparatus and the channel equalization circuit is further configured to employ the second plurality of delay elements in a different phase of operation of the apparatus, whereby the first and second pluralities are constituted from a single memory element.

17. The apparatus according to claim 16, wherein said apparatus is incorporated in an integrated circuit chip.

18. An apparatus for demodulating a digital video broadcast signal comprising data modulated on a multiplicity of spaced carrier frequencies, comprising:
an analog-to-digital conversion circuit configured to convert a version of the broadcast signal, reduced in frequency as desired, to a series of digital samples;

a real-to-complex conversion circuit configured to convert the digital samples to complex number values;

a Fourier transform circuit configured to analyze the complex number values to provide a series of signal values for each of the multiplicity of carrier frequencies;

an automatic frequency control circuit and provide a control signal for controlling the frequency of the signals input to the Fourier transform circuit, in response to the output of the Fourier transform circuit; and a signal processing circuit configured to provide a decoded output in response to the series of signal values comprising a channel equalization circuit and a channel state information generating circuit.

19. The apparatus according to claim 18, wherein said apparatus is incorporated in an integrated circuit chip.

20. A method of demodulating digital video broadcast signals comprising data modulated on a multiplicity of spaced carrier frequencies, the method comprising:

converting an input broadcast signal to a frequency sufficiently low to enable analog-to-digital conversion of the signal;

converting the broadcast signal to a series of digital samples;

converting each digital sample to a complex number value;

analyzing the complex number values to provide a series of Fourier transform signal values for each carrier frequency;

producing a signal from the Fourier transform signal values for controlling the frequency of the signal formed by the complex number values;

performing channel equalization on the Fourier transform signal values; and generating state information from the Fourier transform signal values and providing said state information and channel equalization in an output for decoding based on the Fourier transform signal values.

21. The method for demodulating a digital video broadcast signal comprising data modulated on a multiplicity of spaced carrier frequencies, the method comprising:

converting the broadcast signal to a complex number version of the broadcast signal;

analyzing the complex number version of the broadcast signal to provide a series of signal values for each of the multiplicity of carrier frequencies;

removing the common phase error in the signal values by phase-error-correction and providing processing delayed versions of the signal values with the current signal values; and providing a signal for controlling the frequency of the complex number version of the broadcast signal in response to the phase-error-corrected signal values;

compensating the phase-error-corrected signal values for communication channel impairments by channel equalization and providing processing delayed versions of the signal values with the current values, wherein the phase-error-correction employs a plurality of delay elements in one phase of operation and the channel equalization employs the same plurality of delay elements in a different phase of operation.

22. The method for demodulating a digital video broadcast signal comprising data modulated on a multiplicity spaced carrier frequencies, the method comprising:

converting of a version of the broadcast signal, reduced in frequency as desired, to a series of digital samples using an analog-to-digital converter;

converting the digital samples to complex number values;

analyzing the complex number values to provide a series of Fourier transform signal values for each of the multiplicity of carrier frequencies;

frequency controlling coupled to receive the output of the Fourier transform for providing from the series of Fourier transform signal values a control signal for automatically controlling the frequency of the signals used to generate the Fourier transform signal values;

performing channel equalization on the Fourier transform signal values; and generating state information from the Fourier transform signal values and providing the state information and channel equalization in an output for decoding based on the Fourier transform signal values.

* * * * *